United States Patent [19]

Konishi et al.

[11] Patent Number: 4,992,647

[45] Date of Patent: Feb. 12, 1991

[54] TICKET PROCESSING TERMINAL DEVICE WHICH ACCEPTS PREVIOUSLY ISSUED TICKETS FOR MODIFICATION OR EXCHANGE

[75] Inventors: Hiroshi Konishi; Haruo Kimura; Yoshihiro Nakamura; Toshiharu Hashimoto; Tadashi Hasegawa; Sadao Sone, all of Tokyo, Japan

[73] Assignee: Oki Electric Industry Co., Ltd., Tokyo, Japan

[21] Appl. No.: 185,382

[22] Filed: Apr. 25, 1988

[30] Foreign Application Priority Data

Apr. 23, 1987 [JP] Japan .................................. 62-98582
May 29, 1987 [JP] Japan ................................ 62-131489

[51] Int. Cl.[5] ........................ G07B 1/00; G07B 11/02; G06K 1/14; G06K 17/00

[52] U.S. Cl. ...................................... 235/379; 235/384

[58] Field of Search ................. 364/407; 235/379, 384

[56] References Cited

U.S. PATENT DOCUMENTS

| | | | |
|---|---|---|---|
| 3,622,995 | 11/1971 | Dilks et al. | 364/407 X |
| 3,958,103 | 5/1976 | Oka et al. | 235/384 |
| 3,980,167 | 9/1976 | Tamura et al. | 194/210 |
| 4,166,540 | 9/1979 | Marshall | 209/555 |
| 4,225,779 | 9/1980 | Sano et al. | 235/379 |
| 4,321,672 | 3/1982 | Braun et al. | 235/379 X |
| 4,322,612 | 3/1982 | Lange | 235/419 |
| 4,357,530 | 11/1982 | Roes et al. | 235/384 |
| 4,365,700 | 12/1982 | Arimoto et al. | 235/379 X |
| 4,385,285 | 5/1983 | Horst et al. | 235/379 X |
| 4,449,186 | 5/1984 | Kelly et al. | 364/407 |
| 4,479,194 | 10/1984 | Fogg et al. | 364/900 |
| 4,493,103 | 1/1985 | Yamashita et al. | 235/384 X |
| 4,535,892 | 8/1985 | Roes et al. | 209/3.3 |
| 4,562,340 | 12/1985 | Tateisi et al. | 235/379 |
| 4,581,523 | 4/1986 | Okuno | 235/479 |
| 4,602,332 | 7/1986 | Hirose et al. | 235/379 X |
| 4,608,488 | 8/1986 | Hirose et al. | 235/384 |
| 4,618,085 | 10/1985 | Kimura et al. | 225/100 |
| 4,739,156 | 4/1988 | Watanabe | 235/379 |
| 4,786,791 | 11/1988 | Hodama | 235/449 |
| 4,794,530 | 12/1988 | Yukiura et al. | 364/407 |

FOREIGN PATENT DOCUMENTS

| | | |
|---|---|---|
| 0103759 | 3/1984 | European Pat. Off. . |
| 0225602 | 10/1986 | Japan . |
| 8504972 | 7/1985 | PCT Int'l Appl. . |
| 8504973 | 7/1985 | PCT Int'l Appl. . |
| 2102740 | 2/1983 | United Kingdom . |

OTHER PUBLICATIONS

"All About Metro" brochure, Washington Area Metropolitan Area Transit Authority, Dec. 1983.

*Primary Examiner*—Clark A. Jablon
*Attorney, Agent, or Firm*—Spencer & Frank

[57] ABSTRACT

A ticket processing terminal device includes a hopper to store medium that is to become prescribed tickets, a separation and pick-up section for separating and picking up one sheet of medium at a time from the hopper, a stacker to store those of the tickets inserted through the insertion opening which are replaced by the medium, a print section for printing on the ticket that has been inserted through the insertion opening or the medium picked up from the hopper, and is to be discharged through a discharge opening, a transport path to transport the tickets and medium between the above mentioned component elements, and a ticket information reader for magnetically or optically reading the information that has been given to the ticket, and a magnetic write section disposed along the transport path for writing, erasing or rewriting on the magnetic stripe if the ticket inserted through the insertion opening or the medium picked up from the hopper has such a magnetic stripe. The terminal device can accept a plurality of tickets, temporarily store them, and subsequently reissue either modified versions of less than the original number inserted or a new medium to replace the plural inserted tickets.

12 Claims, 5 Drawing Sheets

TICKET PROCESSING TERMINAL DEVICE WHICH ACCEPTS PREVIOUSLY ISSUED TICKETS FOR MODIFICATION OR EXCHANGE

BACKGROUND OF THE INVENTION

1. Field of the Invention

The present invention relates to a ticket processing terminal device for issuing airline boarding tickets and various types of reservation and other tickets. The invention also relates to processing of information with respect to these tickets, and issuing reservation tickets or the like in exchange for money-equivalent notes or the like.

2. Technology Review

The use of reservation systems is increasing in the fields of passenger transportation, drama and music concerts and other fields of entertainment as well as many others, and automation has been carried out for some time in order to accurately manage the large amounts of reservation information. As a result of this, various types of ticket issuing machines have been proposed and brought into practical operation.

FIG. 4 is a side cross section indicating the configuration of one example of such a ticket issuing machine, and in this figure, 1 is a device housing, and on the top of the front panel of this device housing 1 is an operation keyboard 2 provided with operating keys for the input of information by the operator, and on top of the device housing 1 is a display section 3 which is a CRT or some other type of display device to display the information, etc.

Number 4 indicates a ticket discharge opening provided on the top of the device housing 1, while 5 indicates a ticket printer section located inside the device housing 1. The printer section 5 includes a platen 6, a print head 7 located opposite this platen 6, a ribbon supply reel 8, a ribbon take-up reels 9, an ink ribbon 10 wound around both of these reels 8 and 9 and set so as to pass in front of the print head 7, and other parts that are not indicated but which include a motor, a drive transmission mechanism and the like that drive sections 6 through 10.

Number 11 is an unprinted medium which is to become a reservation ticket or the like. A hopper 12 is located at the bottom of the device housing 1, and stores the medium in fanfold form. The hopper 12 includes a near end detector, not shown, for the medium 11, as well as other necessary mechanisms.

Number 13 is a transport path that has a belt and rollers to sandwich the medium 11 so that is can be transported, and this transport path 13 is located so as to link the print medium supply opening of the hopper 12, the print section comprising the print head 7 and the platen 6 in the printer section 5 and the ticket discharge opening. A cutter 14 is located along this transport path between the print medium supply opening and the print section.

Number 15 is a journal printer section positioned above the printer section 5, and this journal printer section 15 includes journal paper 16 wound into a roll, a platen 17, a print head 18 positioned opposite this platen, take-up rollers 19a and 19b positioned at the top of the device housing 1, and the motor and the drive transmission mechanism and other parts that drive sections 16 through 19a and 19b. The journal paper 16 is set so that it passes from its support part between the platen 17 and &he print head 18, and through the paper discharge opening in the top surface of the device housing 1, and reaches the take up rollers 19a and 19b.

FIG. 5 is a function block diagram for the device shown in FIG. 4, and in this diagram, 20 is a main control device for the overall control of the device, and to this main control device 20 are connected the keyboard 2, the printer section 5 and the journal printer section 15, as well as a display control section 21, a discharge sensor 22, a hopper mechanism section 23, a memory such as RAM 24, a communications control section 25 and a transport control section 26, all of which are governed by this main control device 20.

The display control section 21 controls the content of the display performed by the display section 3, while the discharge opening sensor 22 is for detecting the presence or absence of a ticket at the ticket discharge opening 4 in FIG. 4, and the hopper mechanism section 23 is comprised of a near end detection sensor included in the hopper, and a means of supplying the medium 11.

The memory 24 is used to store the information that is input from the keyboard 2 or the like, the communications section 25 is an interface to perform transmission and receipt of information to and from a host device, and the transport control section 26 is for controlling a drive device group 27 such as the motors, solenoids and the like, that are not indicated in the figure, for driving the belt, the roller and other elements forming the transport path, and a sensor group 28 that detects positions of the medium 11 that is transported by the transport path 13.

If, for example, this configuration is used to issue a ticket for a reservable seat on a train, the operator uses the keyboard 2 to input the names of the departure and arrival stations, the name of the train, the number of the train, the boarding date and time and other information. This information will then be temporarily stored in the memory 24 and at the same time will be communicated by the main control section 20 via the communications control section 25 to the host device, and the seating information for the train specified by the information will be retrieved from the files of the host device.

The retrieved information is then sent to the main control section 20 via the communications control section 25 and the main control section 20 temporarily stores &his seating information in the memory 24 and at the same time displays it on the display section S via the display control section 21.

The operator then looks at this information and judges whether or not it is possible to make a seat reservation, and if possible, uses the keyboard 2 to input the information specifying the seat number of the seat to be reserved and the issue of the ticket, so that the seat number is stored in the memory 24 and so that the control section 20 drives the drive device group 27 through the transporter control section 26.

By this operation, the transport path 13 transports the medium 11 to the prescribed position and the cutter 14 cuts the medium 11 into the prescribed length, and then the medium 11 is again transported by the transport path 13 to the position for printing located between the printer section 5 and the platen 7.

After that, the main control section 20 sends the print instruction and the information stored in the memory 24, to the printer section 5, and through this, the print head 7 uses the ink ribbon 10 to print the information onto the medium.

After the printing has finished, the main control section 20 uses the transport control section 26 to drive the drive device group 27. As a result, the medium 11 is transported by the transport path !3 to the ticket discharge opening 4, and a shutter not indicated in the figure opens so that the medium 11 is discharged through the ticket discharge opening 4 as a reservation ticket.

In the course of the above processing, the journal printer section 15 prints out the information that is to be preserved and operates according to the instructions of the main control section 20 so that the print head 18 prints onto the journal paper 16, and after that the journal paper 57 is taken up by the take-up rollers 19*a* and 19*b*.

In conventional ticket issuing devices such as the one described above, the information necessary to issue a reservation ticket still has to be obtained by the operator asking the customer to whom the reservation ticket is to be issued, the operator has to operate the keyboard or some other device to perform input, and also, if, as in the case of reservation tickets for airlines, the airline ticket issued by a travel agency or the like is exchanged at the airport counter for a boarding ticket, the operator has to use the keyboard to input the information that is already contained on the airline ticket to create a new boarding ticket. This increases the number of operations that the operator has to perform, and therefore creates the problem of increased operator load.

Another problem is that the medium to be processed as the reservation ticket is limited to the one type stored in the hopper in advance, so that replacement issue of tickets and processing on information for other tickets cannot be made.

Moreover, in recent years, a system has been proposed in which boarding tickets for airlines are provided with a magnetic stripe on which prescribed information is recorded at the time of issue; a card reader is provided at the boarding gate in an air terminal to read the information on the magnetic stripe on the boarding ticket; and when the information is valid, the gate is opened. But the problem is that the conventional ticket issuing device cannot issue or process the boarding tickets with a magnetic stripe.

Another problem is that a failure of the read unit means that the device can no longer be used until the repair work is complete, and that if it is necessary to use the device before the read unit is repaired, then an operator will have to input the necessary information.

Purchasing a ticket in conventional ticket processing is generally performed in cash i.e. cash is passed between the customer and the person in charge of ticket issue or sales.

Performing transactions in cash in this way between the customer and person in charge lightens the load on the operator, but the recent diffusion of credit cards and cash cards has led to an increase of purchasing being performed without cash to the extent that transactions that can be finalized only in cash have come to be regarded by customers as inconvenient.

In the case of such cashless transactions, the load upon the operator is not increased to any great degree if this work is performed by the operator as well, but in the case of the conventional devices, there is no provision for the cashless issuance of tickets.

SUMMARY OF THE INVENTION

An object of the invention is t eliminate these problems.

Another object of the invention is to realize a novel and, versatile ticket processing device capable of processing of multiple types of tickets including media used to make tickets or tickets with a magnetic stripe; of writing, erasing and rewriting of information on the ticket issued from the device as well as ticket inserted from outside to inside the device; and of replacement issue of tickets.

Another object of the invention is to enable the processing of tickets having magnetic stripes.

A further object of the invention is to realize a ticket processing terminal device that allows for the cashless ticket issuance processing.

According to the invention, there is provided a ticket processing terminal device comprising an operation part to input the information necessary for the processing of the tickets, a display part to display information, messages, or the like necessary for ticket processing, a ticket insertion opening, a discharge opening, a hopper to store medium that is to become tickets, a separation and pick-up means for separating and picking up one sheet of medium at a time from the hopper, a stacker to store those of the tickets inserted through said insertion opening which are replaced by the media, a print part for printing on the ticket that has been inserted through the insertion opening or the medium picked up from the hopper, and is to be discharged through the discharge opening, a transport path to transport said tickets and medium between the above mentioned component elements, and a ticket information reader means for magnetically or optically reading the information that has been given to the ticket, and a magnetic write part disposed along the transport path for writing, erasing or rewriting on the magnetic stripe if the ticket inserted through the insertion opening or the medium picked up from the hopper has such a magnetic stripe.

In the above configuration, when required command information is input via the operation section, the separation and pickup means picks up the medium from the hopper. Information can be written on the magnetic stripe at the magnetic write section and the medium can be printed at the print section. The medium can then be issued through the discharge opening as a ticket having a prescribed information.

When a ticket is inserted through the insertion opening, the information contained in the ticket can be read by the ticket information reader means.

On the basis of the read information, automatic judgment can be made on whether processing on the inserted ticket is required or issue of a new ticket in replacement of the inserted ticket is required. If the processing on the inserted ticket is required, then depending on whether or not the ticket has a magnetic stripe, writing, erasing or rewriting can be performed on the magnetic stripe by the magnetic write section, while printing can be made on the ticket by the ticket processing printer section. The ticket can then be discharged.

For replacement issue of a ticket, a medium is picked up from the hopper, both information writing on the magnetic stripe and printing are made, or printing alone is made, in the same way as the above described case, and the medium can then be issued as a new ticket in replacement of the ticket that has been inserted, which is taken in the stacker.

Accordingly, it is possible to process multiple types of tickets including a medium and ticket with a magnetic stripe, and to write, erase or rewrite information on the magnetic stripe on tickets issued from the device as well as tickets issued outside the device, add printing and issue tickets in replacement. The device is therefore versatile in that it can be used for processing of boarding tickets for airlines, and issuing and changing various types of reservation tickets, or the like.

If purchasing is necessary along with the issue processing of the ticket, the operator can manually pass the credit card or some other personal identification card of the customer to whom the ticket is to be issued, through the manual read section in order to obtain the personal information necessary for the settlement.

Failure of the magnetic read section inside the device can be indicated to the operator via the display, and &he operator can then manually operate the manual magnetic read section to obtain the information from the magnetic stripe of the ticket, and then insert this ticket into the device to append to or change the information, or otherwise issue a new ticket.

Therefore, when information is appended to the inserted ticket or when e new ticket is issued according to this, there is not only less information input operation by the operator, but a cashless transaction can also be made by the customer so that the level of service provided to the customer can be upgraded.

Also, even if the magnetic read device in the unit fails, the manual magnetic read section can still be used to read the information on the magnetic stripe of the ticket and so there is less operator load than with conventional machines.

DETAILED DESCRIPTION OF THE PREFERRED EMBODIMENTS

The following will explain the operation, referring to the figures.

Figure 1:
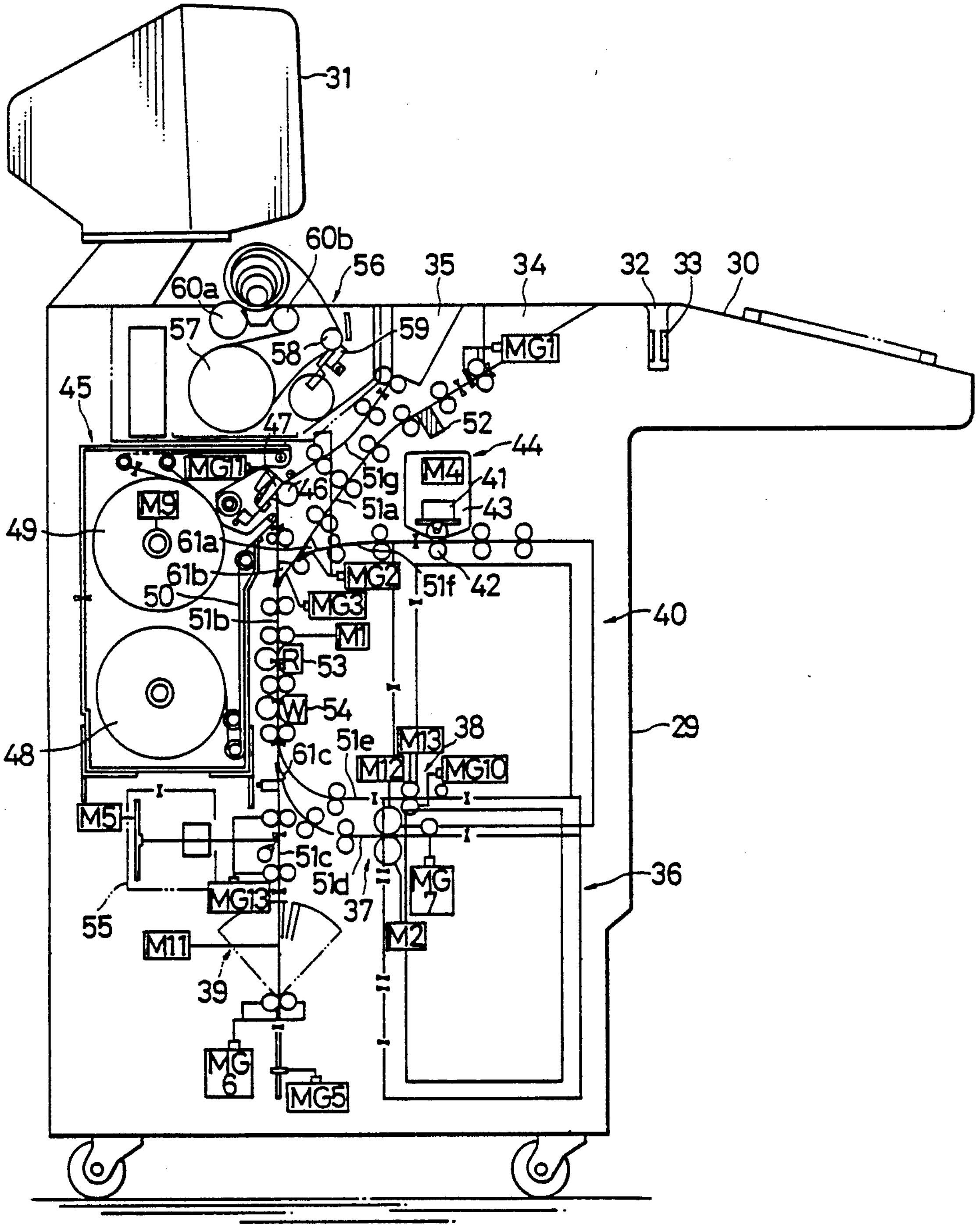
FIG. 1 is a side sectional view showing an embodiment of a ticket processing terminal device according to the invention.
Figure 2:
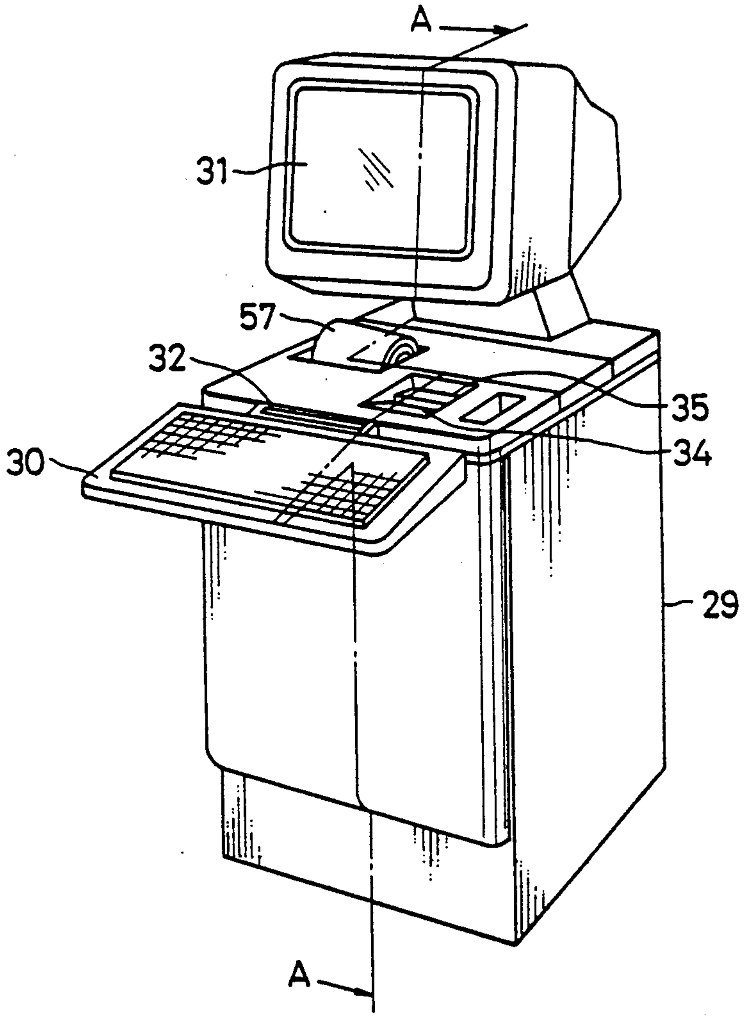
FIG. 2 is a perspective view showing the exterior of the device of FIG. 1.

FIG. 1 is a cross section through the side and indicates an embodiment of the ticket processing terminal device according to this invention, while FIG. 2 is a perspective view of the exterIor of the device in FIG. 1. FIG. 1 shows a cross section taken along the line A—A in FIG. 2.

In the figures, 29 is a device housing and on the top part of the front panel of this device housing 29 is a keyboard 30 that forms the operation section, and is provided with keys for the input of information by the operator. Also on top of the device housing 29 is a CRT or some other device that forms a display section 31 for the display of information, or the like.

Number 32 is a groove of a prescribed length formed between the device housing 29 and the keyboard 30, and this groove is provided with a magnetic read head to read the information from the magnetic stripe on the credit card or some other card placed in the groove 32. These form a manual magnetic read section 33.

Number 34 is a ticket insertion opening provided at top of the device housing 29. 35 is a ticket discharge opening provided on the top surface of the device housing 29 and adjacent to the ticket insertion opening 34. 36 indicates multiple hoppers provided within the device housing 29. In this example, there are two of these hoppers 36 provided near the bottom part of the front panel side of the device housing 29 where they can be easily inserted and removed, and each of these hoppers 36 stores the medium that is used for the reservation tickets or the like.

Numbers 37 and 38 are means provided for separation and pickup of the mediums for the medium supply outlets of the two hoppers 36. These medium separation and pickup means 37 and 38 include pick-up rollers, reverse rollers and feed rollers, and each separate one sheet of the medium (not shown in the diagram) from the hoppers and feed it.

Number 39 is a temporary stacking section which is comprised of a revolving storage section with multiple ticket storage chambers, a means of storing and discharging the tickets to and from these chambers, and the motors, solenoids and the like that drive them. The temporary stacking section 39 is located near the bottom of the device housing 29.

Number 40 indicates stackers positioned above the hoppers 36. In this embodiment there are two of these stackers 40. Near the ticket take-in opening of each of these stackers 40 is a ticket collection printer section 44 which comprises a print head 41, a platen 42, an ink ribbon cassette 43 and a means of driving these.

Number 45 is a ticket processing printer located at the top at the rear side of the device housing 29. This ticket processing printer 48 comprises a platen 46, a print head 47 located across from the platen 46, a ribbon supply reel 48, a ribbon take-up reel 49, and an ink ribbon 50 which is wound around both of these reels 48 and 49 so that it passes in front of the print head 47, and the motor, solenoids, drive transmission mechanism and the like that drive these section 46 through 50.

Numbers **51*a* through 51*g* indicate the transport path comprising belt and rollers and the like that sandwich and transport various types of tickets inserted through the ticket insertion opening 34 and the medium discharged through the hoppers 36. This transport path 51*a* through 51*g* links the ticket insertion opening 34, the ticket discharge opening 35, the medium separation and pickup means 37 and 38 of the hoppers 36, the temporary stacking section 39 and the ticket insertion opening of the stackers 40. The platen 46 of the ticket processing printer section 45 and the print head 47 are located along the transport path 51*g***.

Number 52 is a bar code reader located along the transport path **51*a* and is used as a means of reading the identification information. 53 is a magnetic read sec&ion that is located along the transport path 51*b*. 54 is a magnetic write section that is also located along the transport path 51*b*. 55 is an optical read section which comprises a light source and photo-electric conversion elements and the like, and is located along the transport path 51***c*.

Number 56 is a journal printer section provided at the top of the ticket processing printer section 45, and this journal printer section 56 comprises a journal paper 57 wound into a roll, a platen 58, a print head 59 located across from this platen 58, take-up rollers 60*a* and 60*b* located at the top of the device housing 29, and a motor drive transmission mechanism and the like that drive these sections 57 through 60*a* and 60*b*. The journal paper 57 is set so that it passes from its support part through between the platen 58 and print head 59, through the paper discharge opening provided at the top of the device housing 29 and to the take-up rollers 60*a* and 60*b*.

Numbers 61*a* through 61*c* are blades for changing the direction of transport The blade 61*a* is rotatably placed where transport paths 51*a* and 51*f* come together, while the blade 61*a* is placed where transport paths 51*f*, 5*b* and 51*g* come together, and the blade 61*c* is placed where transport paths 51*b*, 51*c*, 51*d* and 51*e* come together.

Figure 3:
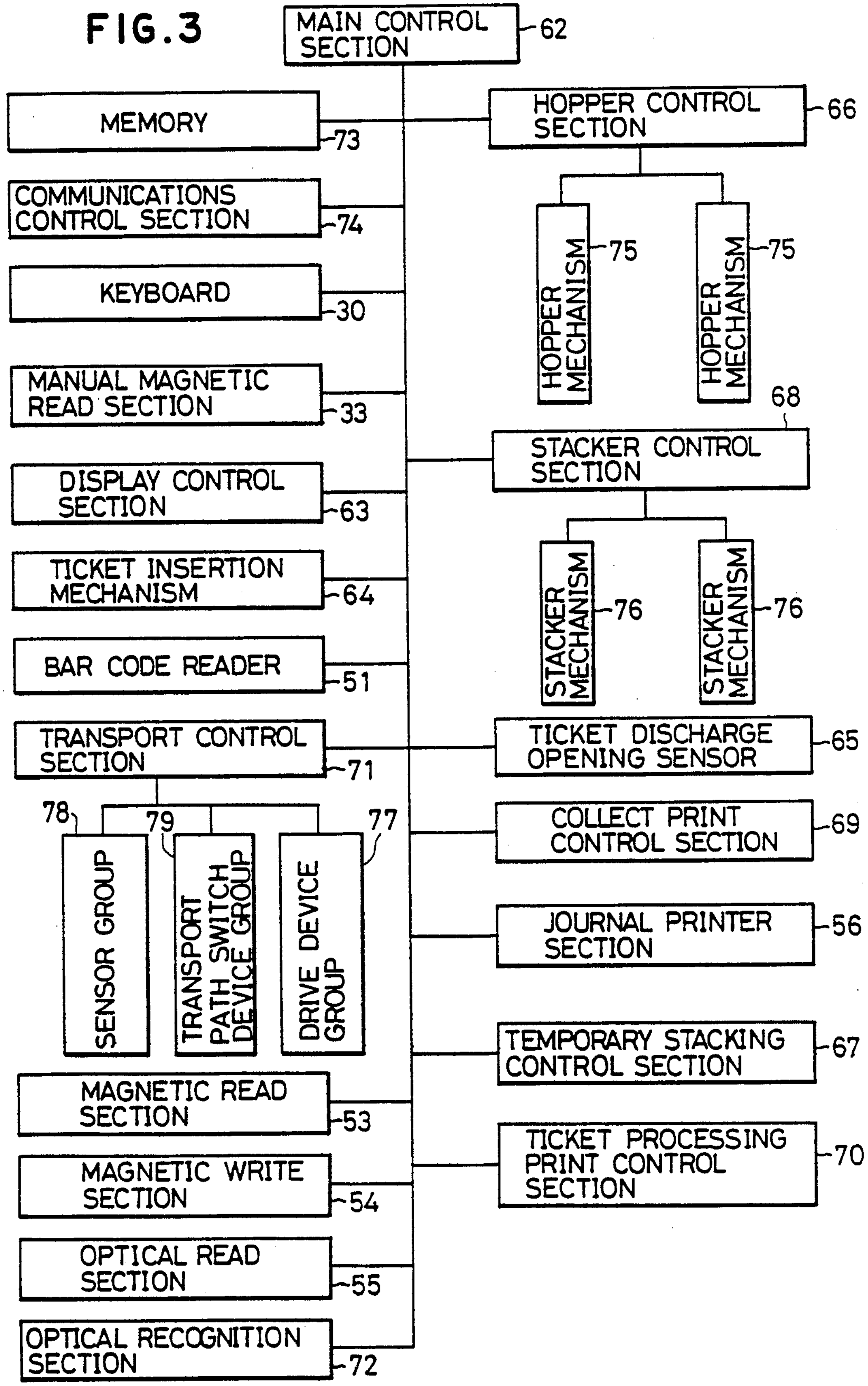
FIG. 3 is a functional block diagram of the device of FIG. 1.
Figure 4:
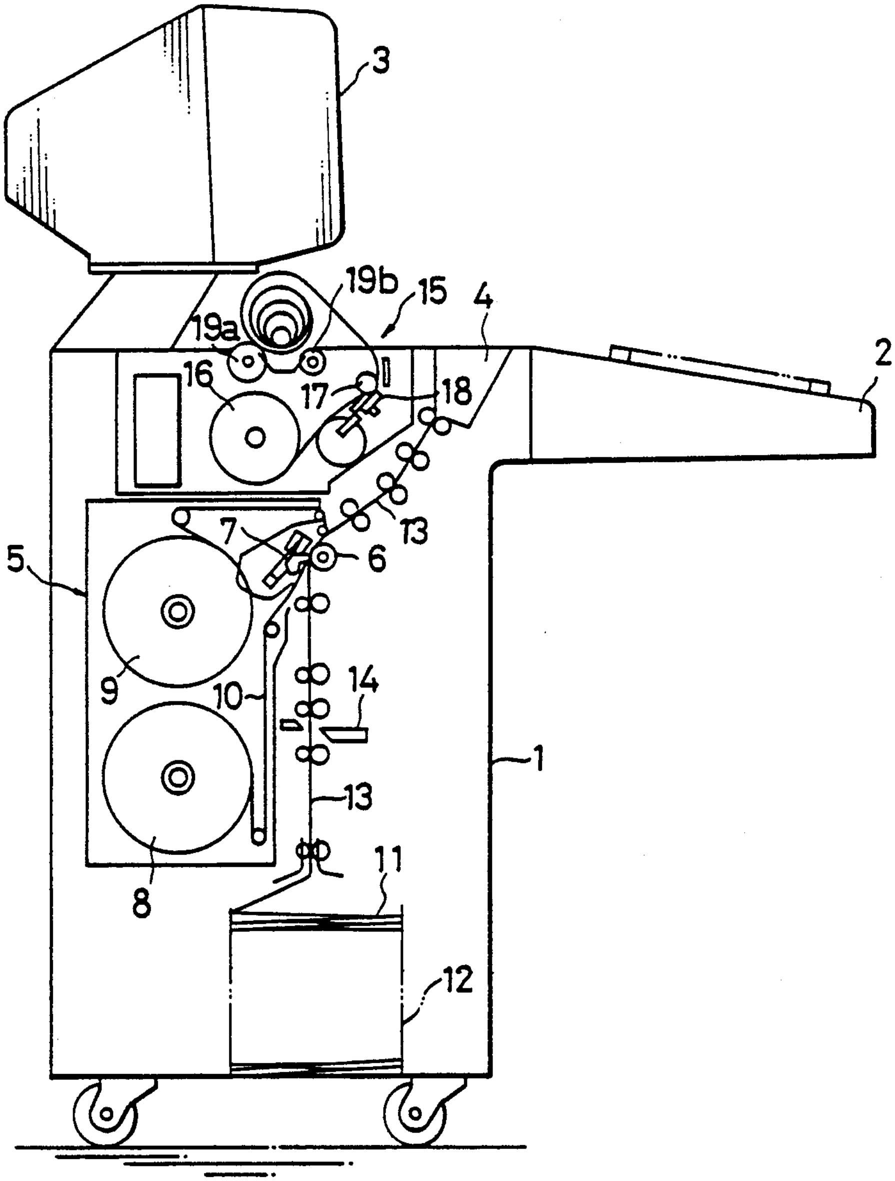
FIG.4 PRIOR ART
FIG. 4 is a side sectional view showing a prior art example.
Figure 5:
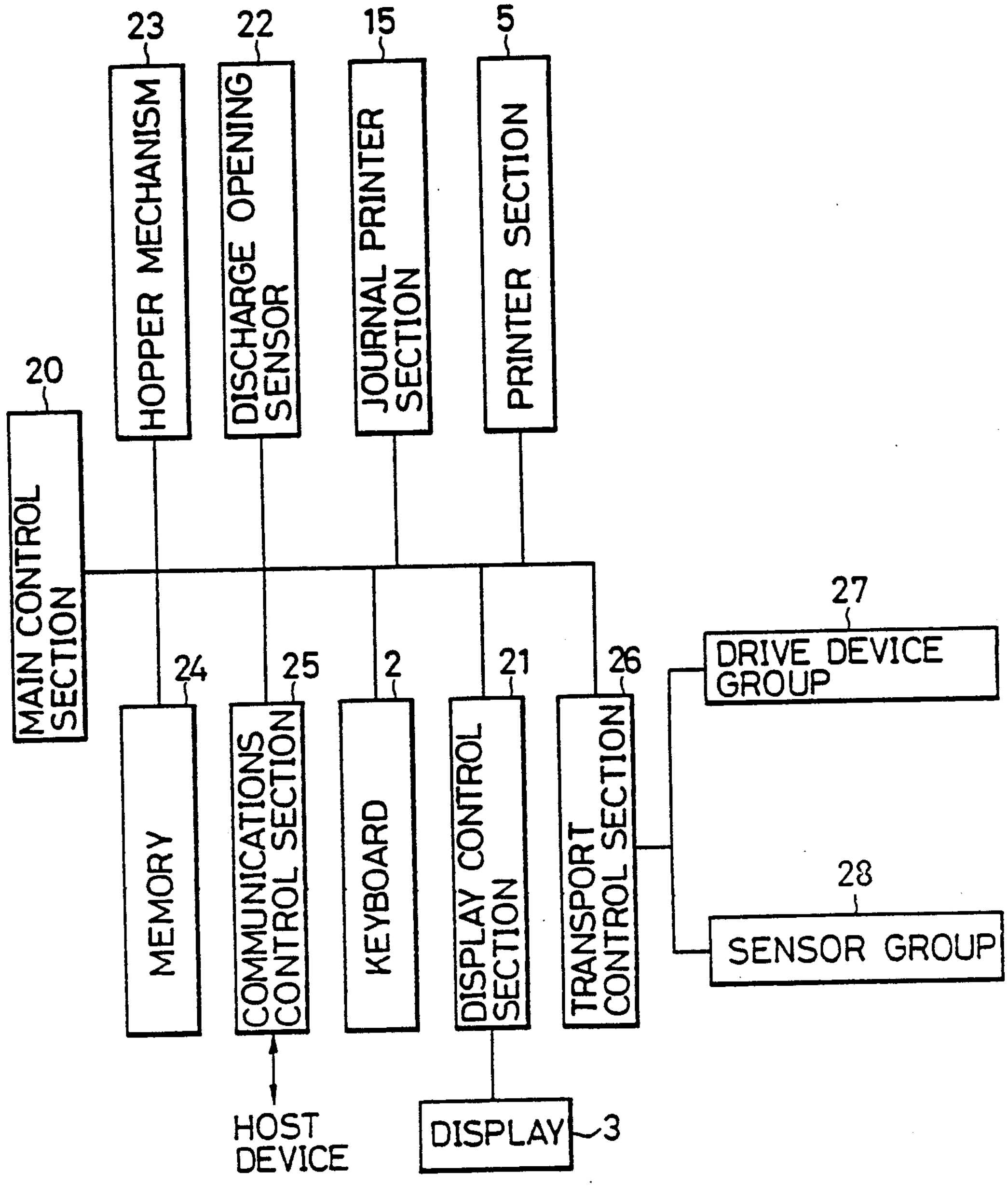
FIG.5 PRIOR ART
FIG. 5 is a functional block diagram of the prior art example.

FIG. 3 is a functional block diagram for the device indicated in FIG. 1 and FIG. 2, and in this diagram, 62 is a main control section or device that controls the entire device. To this main control device 62, the keyboard 30, and the manual magnetic read section 33, the bar code reader 82, the magnetic read section 53, the magnetic write section 54, the optical read section 55 and the journal printer section 56 are connected. A display control section 63, a ticket insertion mechanism section 64, a hopper control section 66, a temporary stacking control section 67, a stacker control section 68, a collect print control section 69, a ticket processing print control section 70, a transportor control section 71, an optical recognition section 72, a memory such as RAM 73 and a communications control section 74 and the like are also connected to the main control section 62. All of these sections are governed by the main control section 62.

The display control section 63 controls the content of the display on the display section 31 indicated in FIG. 1 and FIG. 2, in accordance with the instructions of the main control section 62. The ticket insertion mechanism section 64 comprises a shutter located at the ticket insertion opening 34, its drive system and sensors. The ticket discharge sensor 65 is for detecting the presence or absence of a ticket at the ticket discharge opening 35.

The hopper control section 66 controls the medium separation and pickup means 37 and 38 and the motors and the like that drive them. The hopper control section 66 also identifies the type of medium inside each of the hoppers 36 on the basis of the identification information from the hopper mechanism section 75. The hopper mechanism 75 consists of sensors and the like not indicated in the figures, and controls the medium on the basis of at least the identification information and the information in the memory 73.

The temporary stacking control section 67 controls the motors, solenoid and the like of the temporary stacking section 39. The stacker control section 68 controls each of the stackers 40 via the stacker mechanism section 76 comprising sensors and the like that are not shown in the figure.

The collect print control section 69 and the ticket processing control section 70 control the printer section for ticket collection 44 and the printer section for ticket processing 45, respectively. The transport control section 26 controls drive device 77 such as motors and solenoids that drive the belt and the rollers forming the transport paths 51*a* through 51*g*, the sensor group 78 that detects the transport status of the tickets and the medium transported by the transport paths 51*a* through 51*c*, and the transport path switching device group 79 comprising the solenoids and the like that drive the glades 61*a* through 61*c*. The optical recognition section 72 converts the signal output from the optical read section 55 into information in the form of characters or the like.

The memory 73 is a storage means for storing the information necessary for processing the tickets and medium. The communications control section 74 performs the sending and receiving of information to and from the host device.

The following gill explain the operation of these sections described above.

First of all, the operator presses the keys on the keyboard 30, and the main control section 62 displays a response message and the status of the device on the display section 31 via the display control section 63.

According to this message, the operator then presses keys on the keyboard 30 to input the required information, and the main control section 62 then starts the device in accordance with information, and performs the following ticket processing operation.

Processing where the medium is picked up from the hoppers 36, and is issued as a ticket having the required information In cases when the information input gas instructions for the processing where the medium stored in the hoppers 36 is to be printed, or the like, and then discharged, the main control section 62 specifies the type of medium to the hopper control section 66 and gives that pickup instruction.

With this, the hopper control section 66 picks up one sheet of the specified medium from one of the two hopper control section 66. This is to say that the medium separation and pickup means 37 and 38 are selectively driven so t hat one sheet of the medium at the top of the required hopper 36 is separated and picked up.

The medium picked up is transported by the transport path 51*d* or 51*e* that is driven by the devices of the drive device group 77 controlled by t he transport control section 71 according to the prior instructions of the main control section 62. When this occurs, the transport path 51*b* operates in the same manner and the blade 61*c* is rotated by the drive devices in the transport path switching device group 79 so that the angle is changed to link transport path 51*d* or 51*e* with 51*b*. Accordingly, the medium is transferred from either transport path 51*d* or 51*e* to 51*b*, and is transported to the position of the magnetic write section 54.

During this time, the main control section 62 determines whether or not magnetic information should be written, according to whether or not the medium which is one of the previously described types of medium, has a magnetic stripe or not. If the medium does have a magnetic stripe, then the required information stored beforehand in the memory 73 is sent to the magnetic write section 54 along with the write instruction. With this operation, the magnetic stripe section 54 writes the information to the magnetic stripe of the medium, and after having been written, that information is read by the magnetic read section 53 and checked at the main control section 62 according to the instructions of the main control section 62.

The information stored in the memory 73 includes fixed information set in accordance with the status of operation of the device, information input by the operator via the keyboard 2, and information that is sent from the host device as a result of the main control section 62 communicating with the host device via the communications control section 74.

When this check has finished, the mein control section 62 drives the drive device group 77 via the transport control section 71, operates the transport paths 51*b* and 51*g*, and at the same time drives the required drive devices of the transport path switching device group 79 to rotate the blade 61*b* so that the blade 61*b* links the transport paths 51*b* and 51*g*.

With this operation, the medium is passed from transport path 51*b* to 51*g* and this transport path 51*g* transports the medium until it is between the platen on the ticket processing printer section 45, and the print head 47' and &hen the transport path 51*g* ceases operation.

At this point, the transport paths 51*d*, 51*e* and 51*b* have of course already ceased operation.

If the medium does not have a magnetic stripe, then magnetic information is not written or checked on the medium after it is picked up from the hopper 36, and the medium is transported until it is between the platen 46 and the print head 47.

Then, the main control section 62 sends the information stored in the memory 73, and the print instruction for such, to the ticket processing print control section 70. Accordingly, the ticket processing print control section 70 operates the ticket processing printer section 45 so that the print head 47 of this ticket processing printer section 45 prints the information stored in the memory 73, at the prescribed position on the medium, using the ink ribbon 50.

In this case, the information stored in the memory 73 is also the same as for the previously described case.

When the printing has finished, the transport path 51*g* operates once again to transport the medium and discharge it at the ticket discharge opening 35 and at the game time, the main control section 62 displays the required message through the display control section 63 and waits for the operator to take the medium.

When the operator takes the medium from the ticket discharge opening 35, this action is detected by the ticket discharge sensor 65 provided at the ticket discharge opening 35, and this detection signal is detected by the main control section 62 and the device returns to the initial status of the standby for the following processing.

In this way, when the medium picked up from the hoppers 36, information can be written on magnetic stripes or printing made at the prescribed position on the medium, and the ticket discharged through the ticket discharge opening 35. Accordingly, if the reservation information for airlines, trains, or the like is stored in the memory 73, the files of the host device or some other means, then the operator can operate the keyboard 30 and only input the prescribed information, to issue the medium as a reservation ticket such as a seat reservation ticket, a boarding ticket.

In particular, the installation of this device at travel agencies can enable the issuance of boarding tickets to which seat designation information and a magnetic stripe have been appended, eliminating the need of the customer to go to the airport counter to have the ticket issued.

Of course, this system is not limited to boarding tickets for airlines, end seat reservation tickets and boarding tickets for trains, but can also issue tickets such as seat reservation tickets for drama performances, as well as issue various types of coupon tickets, or the like.

Processing when a ticket inserted through the ticket insertion opening 34 has its information read, and either has new information written, information erased or rewritten thereon, and is then either discharged or a new ticket is issued in its place when the information input by the operator indicates a processing in which a ticket is to be inserted through the ticket insertion opening 34 and discharged after it has been printed or the like, when the ticket Is inserted into the ticket insertion opening 34, this inserted ticket Is then detected by a sensor. A detection signal is then sent to the main control section 62.

With this, the main control section 62 that operates the solenoid and other parts of the ticket insertion mechanism section 64, opens the shutter, and drives, via the transport control section 71, the prescribed devices of the drive device group 77 so as to operate transport paths 51*a* and 51*c*.

Through this, taking the ticket into the transport path 51*a* closes the shutter and the ticket that is taken in is transported by transport path 51*a*. When it is transported to the position of the bar code reader 52, the instructions of the main control section 62 cause reading of the bar code printed on the ticket, and then the operations of the transport path 51*a* ceases.

The bar codes that are read at this stage are sent to the main control section 62 as identification information for the purpose of identifying the type of ticket, and this information is temporarily stored in the memory 73. On the basis of this identification information, the main control section 62 determines whether or not the ticket is appropriate for the processing indicated by the operator.

If it is determined as being inappropriate, the transport path 51*a* operates to transport the ticket in the reverse direction, and the shutter opens at the same time so that the ticket is sent back to the ticket insertion opening 34 and returned to the operator.

On the other hand, if the ticket is regarded as appropriate, the maIn control section 62 outputs the read instruction with respect to both the magnetic read section 53 and the optical read section 55, in accordance with the identification information. This is to say that on the basis of the identification information, the main control section 62 outputs the read instruction to both the magnetic read section 53 and the optical read section 55 if the ticket has a magnetic stripe. The main control section 62 outputs the read instruction to only the optical read section 55 if the ticket is not one that has a magnetic stripe.

At the same time, the main control section 62 operates the prescribed devices of the drive device group 77 and the transport path switching devices group 79, via the transport control section 71, and this operates the transport path 51*a*, and transport paths 51*b* and 51*c*, and rotates blades 61*a* through 61*c* to link transport paths 51*a*, 51*b* and 51*c*.

With this operation, the ticket passes through the transport path 51*a* and is passed to transport path 51*b*. If the ticket being transported along this transport path 51*b* is one having a magnetic stripe, then the information written on that magnetic stripe is read by the magnetic read section 53, and the read information is sent to the main control section 62 and stored in the memory 73.

After this, the ticket is again passed from transport path 51*b* to 51*c*, and along this transport path 51*c*. The information that is either printed or handwritten on the ticket is read by the optical read section 55, and the read information is sent to the main control section 62 via the optical recognition section 72, and then temporarily stored in the memory 73.

Then, the main control section 62 gives the storage instruction for the ticket, to the temporary stacking control section 67, and with this, the temporary stacking control section 67, operates the temporary stacking section 39 and stores the ticket in one of the storage chambers of that storage unit.

Here, on the basis of the ticket information stored in the memory 73, the main control section 62 by itself or through communication with the host device via the communications control section 74, determines the type of processing that should be continued, and then executes one of the following three types of processing, depending on what is determined.

PROCESSING TYPE 1

Processing Type 1 is processing that is implemented on the basis of the information read from the ticket and information is either printed or magnetically appended to the ticket which is then discharged.

This is to say that if the main control section 62 selects Processing Type 1, it causes the transport control section 71 to perform a reverse operation for the prescribed devices of the drive device group 77 so as to operate the transport paths 51*c* and 51*b* and at the same time cause the temporary stacking control section 67 to operate the temporary stacking section 39, which discharges a stored ticket from the storage chamber of the storage unit.

The ticket discharged from the storage unit is transported to transport path 51*c* and then passed from this transport path 51*c* to transport path 51*b*.

After this, the ticket goes through the same process as the medium picked up from the hoppers 36 and is discharged through ticket discharge opening 35 where it is taken by the operator.

PROCESSING TYPE 2

Processing Type 2 is processing performed on the basis of the information read from the ticket, and takes the ticket into the stacker 40, appends information to the medium stored in the hopper 36 and issues a new ticket to replace the inserted ticket.

This is to sag that if the main control section 62 selects Processing Type 2, then the specification for the type of medium and the pickup instruction are given to &he hoppers 36 to cause the medium to be picked up and transported in the same way as previously described, and in accordance with necessity, have magnetic information written and checked, and information printed before the ticket is issued as the required ticket through ticket discharge opening 35 where it is taken by the operator.

Ticket issuance need not be confined to single tickets, as multiple tickets may also be issued in accordance with the information from the previous ticket.

After this, the main control section 62 causes the transport control section 71 to perform reverse operation for the prescribed devices of the drive device group 77 and the transport path switching device group 79 so as to operate the transport paths 51*c*, 51*b* and 51*f* and at the same time rotate the blades 61*a* through 61*c* to link the transport path 51*c*, 51*b* and 51*f*.

Then, the main control section 62 operates the temporary stacking section 39 through the temporary stacking control section 67, and discharges the stored ticket from the storage chamber of the storage unit.

The ticket discharged from the storage unit is transported to transport path 51*c* and then passed to transport path 51*b*. Along this transport path 51*b*, if the previously, described ticket is one having a magnetic stripe, then on that magnetic stripe is written magnetic information indicating cancellation, invalidation, or the like according to the instructions of the main control section 62.

After this, the ticket is transported from transport path 51*b* to transport path 51*f*. Along this transport path 51*f*, the prior instructions from the main control section 62 cause the collect print control section 69 to operate the print head 41 of the ticket collect printer section 44 to print "cancelled", "invalidated" or the like on the ticket, using the ink ribbon of the ink ribbon cassette 43.

Then, once this printing has finished, the ticket is then sent to the stacker 40 according to its type.

PROCESSING TYPE 3

In Processing Type 3, processing cannot ge implemented only with the information that is read from a single ticket, but processing can be implemented by reading the information of a number of tickets, and the processing is for the writing, erasing, or rewriting of information on tickets inserted through the ticket insertion opening, or the issuance of a new ticket in replacement of the inserted ticket.

This is to say that if the main control section 62 selects Processing Type 3, or rather, if as a result of its own judgment or communications via the communications control section 74 with the host device, the main control section 62 determines that the information from a single ticket is insufficient, and judges that processing cannot be implemented unless the information from a multiple number of tickets is obtained, then the main control section 62 will send a message to this effect to the display section 31 via the display control section 63. This determination is made based on information read by the bar code reader 32, the magnetic read section 53 or the optical read section 55 and temporarily stored in memory.

If the operator then inserts a multiple number of tickets through the ticket insertion opening 34 in sequence, the previously described procedure of ticket transport, information reading and temporary stacking operation will be performed for all of the tickets inserted. Then the necessary amount of data for processing is obtained, the main control section 62 will perform on its own judgment or as a result of communications with the host device via the communications control section 74 will determine whether the temporarily stacked tickets are to have information appended or changed, or the replacement issue of new tickets are to be performed.

If the temporarily stacked tickets are to either have information appended or changed, then the tickets stored in the storage chambers of the storage device of the temporary stacking section 39 are either discharged on a first-in first-out basis or at random and processing similar that for Processing Type 1 is performed. If new tickets are to be issued in replacement of inserted tickets then an operation the same as Processing Type 2 is performed.

In this case, information can be written, erased or rewritten with on some of the temporarily stacked tickets, while the remaining tickets can be replaced with new tickets, in which case it is also possible to issue a different number of tickets than the number which were taken up initially.

In this way, information is read from the ticket or tickets inserted through the ticket insertion opening 34, and on the basis of this read information, information is written, erased or rewritten on the ticket or tickets which can then be either discharged or automatically replaced with new tickets so that, for example, in addition to allowing the batch processing for edit, issue, change and the like for excursion tickets for train, air travel or the like, it is possible to automatically replace money equivalent notes such as discount tickets or complementary tickets or tickets of the game value, with travel tickets or the like, or automatically replace tickets not having magnetic stripes with those that do. It is therefore possible to issue boarding tickets in replacement of airline reservation tickets that were issued somewhere else.

In the present embodiment, the manual magnetic read section 33 is normally used as the means of reading the information when personal identification cards such as credit cards the cards used to pay for the issued tickets, the processing of information, or the issue of replacement tickets that have been described above. Placing the card in the groove 32 and passing it along this groove by hand enable the information on the magnetic stripe of the card to be read by the magnetic read head located in this groove 32, and the read information is sent to the main control section and stored in memory 73 so that the settlement for the prescribed processing can be made. However, the manual magnetic read section 3 can also be used when a failure occurs in the magnetic read section 83 in the device housing 29.

This is to say that if, in the previously described processing, the information contained on that magnetic stripe cannot ge read after the ticket has been inserted through the ticket insertion opening 34, the main control section 62 causes discharge of that ticket to the ticket discharge opening 35 and at the same time displays a message on the display section 31 to indicate to the operator that the manual magnetic read section 33 should be used to read the information on the magnetic stripe of the ticket.

When the operator uses the manual magnetic read section 33 to read the information on the magnetic stripe of the ticket that information is stored in the memory 73.

After this operation, if the previously described ticket is inserted into the ticket insertion opening 34, the same processing as that described before can then be performed.

In each of the modes of the previously described processing, the journal printer section 56 performs printout of the devices statuses that occur, as well as of the contents of the information processing, the contents of the display screens of the display section 31, and the like. It is operated by the instructions from the main control section 62, and has the print head 59 perform printout on the journal paper 57, and this journal paper 57 is taken up by the take-up rollers **60*a* and 60*b***.

The sensor group 78 detects the status of ticket transport by the transport path **51*a* through 51*g* as described before. And in cases when this sensor group 78 detects a transport abnormality in the course of the above-described processing, the ticket for which this abnormality has occurred is either discharged through either the ticket insertion opening 34 or the ticket discharge opening 35, or taken into the stacker 40**, or if both discharge and stacking are not possible, then the operator is informed by an indicator means, not shown, that recovery work should be performed. The details are omitted here.

The above has been an explanation of an embodiment of this invention but does not limit the invention.

For example, it is possible to freely change the positions of each of the elements in the configuration in the device housing 29, and it is also possible to combine &he ticket insertion opening 34 and the ticket discharge opening 35 into the one opening for both insertion and discharge.

In addition, in the embodiment described above, there are two hoppers 36 and two stackers 40 but it is possible to have only one of each, or three or more.

Moreover, there is a total of three printer sections in the embodiment described above, and if one of them, for example the ticket processing printer section 45, is configured as the dual-purpose receipt printer, then it will be possible to issue a receipt for the previously described settlement by credit card.

As has been described, according to the invention, it is possible to process multiple types of tickets including medium and tickets having a magnetic stripe, write, erase or rewrite information on a ticket issued outside the device, add printing and issue a new ticket. The device is versatile in that it can be used for issuing, replacement, change and the like of various types of reservation tickets, such as boarding tickets for airlines.

Moreover, it is possible to automatically identify the type of the ticket inserted in the device and of the medium stored in the hopper. The operator therefore need not mind the type of the ticket or the type of the medium to be issued as a ticket and can make a uniform processing. The operator's operation is reduced, and hence the operator's load can be reduced.

When a ticket having a magnetic stripe has been inserted through the insertion opening, the information written on the magnetic stripe of the ticket can ge read by a magnetic read section to obtain information necessary to either append to or change the information on the ticket, or to issue a new ticket, and the processing for this ticket can be performed. Then, should settlement become necessary in accordance with this processing, the operator manually passes through the manual read section the credit card or other personal identification card presented by the customer to whom the ticket is to be issued, so that the personal information necessary for the settlement can be read.

Accordingly, when appending information to the inserted ticket, or issuing of a new ticket, this operation not only serves to lessen the information input operation load of the operator, but also improves the level of service with respect to the customer by allowing for cashless settlement.

In addition, should there be a failure of the magnetic read section in the device, a message to this effect can be displayed on the display to inform the operator, so that the operator can then use the manual magnetic read section to read the information from the magnetic stripe and then insert the ticket into the device and append information to it, or issue a new ticket in its place. By being able to do this, it is still possible to process tickets even when there is a failure in the magnetic read section of the device, while at the same time eliminating a cause of considerable operator load.

What is claimed is:

1. A ticket processing terminal device comprising:

an operation means for manually inputting ticket information into said device;

a display means for displaying said ticket information;

a housing having a ticket insertion opening for inserting tickets into said device and a discharge opening for discharging tickets from said device;

a plurality of hoppers for storing media comprising sheets;

a separation and pick-up means for separating and picking up one sheet of said media at a time from said hoppers;

a plurality of stackers for storing tickets inserted through said insertion opening which are to be replaced by one of said media;

a printer means for printing information on a ticket inserted through said insertion opening and for printing information on a medium from one of said hoppers before said medium is discharged through said discharge opening;

a transport means for transporting tickets inserted through said insertion opening to said stackers, for transporting said tickets and said media along a transport path to said printer means from said insert opening and said hoppers, respectively, and for transporting printed tickets and printed media to said discharge opening;

a ticket information reader means for reading information from a ticket, said ticket information reader means comprising:

an identification information read means disposed along said transport means for reading identification information on a ticket inserted through said insertion opening;

a magnetic read means disposed along said transport means for reading information from a magnetic stripe on a ticket inserted through said insertion opening and for reading information from a magnetic stripe on a medium from said hopper; and an optical read means disposed along said transport means for reading optically-readable information on a ticket;

a magnetic write means disposed along said transport means for writing, erasing and rewriting information on a magnetic stripe on a ticket inserted through said insertion opening and for writing information from said operation means and said ticket information reader means on a magnetic stripe on a medium from said hopper;

a temporary stacking means for storing a plurality of tickets inserted through said insertion opening; and a control means for determining the processing mode on the basis of information from said operation means and the result of reading at least one ticket by said ticket information reader means, whereby said at least one inserted ticket is stored separately from other tickets in said temporary stacking means until said control means determines a processing mode and after the determination of the processing mode said at least one ticket in the temporary stacking means or a medium in said hopper is picked up, printed and issued.

2. A device according to claim 1, wherein said operation means includes a manual magnetic read means manually operated for reading information on a magnetic stripe.

3. A device according to claim 2, wherein said device further comprises a second control means for controlling said display means to indicate a failure in said magnetic read means, and said manual magnetic read means includes means for reading information on the magnetic stripe of a ticket, whereby when a failure in the magnetic read means is indicated on the display means, said manual read means is used in place of said magnetic read means to read information on the magnetic stripe on the ticket.

4. A device according to claim 1, wherein said display means includes means for displaying the content of the processing being performed.

5. A device according to claim 1, wherein said insertion opening is provided with a detection means for detecting the presence or absence of a ticket inserted into said opening and a shutter for opening and closing said insertion opening, and said device further comprises a second control means which controls opening and closing of said shutter in accordance with the result of detection at said detection means.

6. A device according to claim 1, further comprising a blade for switching the direction of transport of tickets through said transport path.

7. A device according to claim 1, further comprising a communications control means for transmitting to a host device information given to a ticket inserted through said insertion opening and read by said ticket information reader means, and for receiving information from said host device, wherein on the basis of the information from the host device, prescribed printing is made on the ticket, and rewriting, appending or deletion of information are performed on a magnetic stripe on said ticket.

8. A device according to claim 1, further comprising second control means which controls picking up of media from said hopper, and, on the basis of information from said operation means and information obtained through communication with a host device controls printing and writing of information on a medium from said hopper, and controls transport of the medium to the discharge opening.

9. A device according to claim 1, wherein said operation means includes means for appending and means for changing information on a ticket inserted through said insertion opening.

10. A ticket processing terminal device comprising:

an operation means for inputting ticket information into said device;

a housing having a ticket insertion opening for inserting tickets into said device and a discharge opening for discharging tickets from said device;

a hopper for storing media comprising sheets;

a stacker for storing tickets inserted through said insertion opening which are to be replaced by one of said media;

a read means for reading information from the ticket that has been inserted;

a printer means for printing information on a ticket inserted through said insertion opening or a medium from said hopper before said medium is discharged through said discharge opening;

a magnetic write means for magnetically writing or erasing information on a medium from said hopper before said medium is discharged through said discharge opening;

a control means responsive to information read from the ticket inserted or information input by said operation means for selecting one of a first, a second and a third processing modes and causing the device to operate in the selected processing mode, said third processing mode being operated when a plurality of tickets are inserted into said device;

said first processing mode comprising magnetically writing information on the inserted ticket or printing information on the inserted ticket, and discharging the inserted ticket through said discharge opening;

said second processing mode comprising magnetically writing information on a medium from said hopper or printing information on a medium from said hopper when a ticket has been inserted, and discharging said medium through said discharge opening as a new ticket while the inserted ticket is stored in said stacker; and said third processing mode comprising at least one of magnetically writing information on at least one inserted ticket, printing information on at least one inserted ticket, magnetically writing information on a medium from said hopper, and printing information on a medium from said hopper, discharging the at least one inserted ticket or said medium through said discharge opening, and storing non-discharged inserted tickets in said stacker.

11. The device of claim 10, wherein said first processing mode comprises magnetically writing information on the inserted ticket and printing information on the inserted ticket.

12. The device of claim 10, wherein said second processing mode comprises magnetically writing information on a medium from said hopper and printing information on a medium from said hopper when a ticket has been inserted.

* * * * *